March 10, 1964

O. ZINKE 3,124,798

REFLECTION-FREE DAMPING STRUCTURE FOR SPACE-PROPAGATED WAVES

Filed Oct. 19, 1955

Inventor:
Otto Zinke.
By ........ Atty

March 10, 1964

O. ZINKE 3,124,798

REFLECTION-FREE DAMPING STRUCTURE FOR
SPACE-PROPAGATED WAVES

Filed Oct. 19, 1955

Inventor:
Otto Zinke.
By M. _____ Atty

United States Patent Office 3,124,798
Patented Mar. 10, 1964

3,124,798
REFLECTION-FREE DAMPING STRUCTURE FOR SPACE-PROPAGATED WAVES
Otto Zinke, Darmstadt, Germany, assignor to Siemens & Halske Aktiengesellschaft, Munich and Berlin, Germany, a corporation of Germany
Filed Oct. 19, 1955, Ser. No. 541,405
13 Claims. (Cl. 343—18)

This invention is concerned with an arrangement for substantially reflection-free damping of space-propagated electromagnetic and acoustic waves impinging upon reflecting bodies. The arrangement may be used in the manner of a facing or lining for reflecting bodies, for example, in building substantially reflection-free control rooms for measuring the operatively effective radiation or interference radiation, antennae radiation, preparing radiation diagrams of loudspeakers and microphones, such operations requiring reflection-free rooms for carrying out measurements unhampered by weather or extraneous electrical or acoustic interference.

It is known to absorb or to dampen incoming electric waves and also acoustic waves, for example, by the use of slag wool impregnated with graphite. It is also known to arrange in front of a conductive wall several layers of insulating material extending in parallel with the wall, the layer resistance decreasing, as compared with the field wave resistance, from high ohmic to low ohmic values.

In accordance with another proposal, a body forming an absorption surface with a surface impedance, for example, of 377 ohm was to be placed in front of a reflecting wall, spaced therefrom by ¼ wave length. The resulting arrangement is very frequency dependent.

It is further known to provide upon a reflecting surface wedge-shaped bodies made of slag wool impregnated with graphite, or spear-shaped bodies for example, made of carbonized discs, the points of such discs facing in the direction of the incoming waves.

The known arrangements have a relatively thick matching and absorption layer; they require relatively great material expenditure and therefore are heavy and expensive.

The object of the invention is to provide damping arrangements for electromagnetic and acoustic waves having damping properties which can cope with higher requirements.

The substantially reflection-free damping arrangement according to the invention provides electrically non-conductive walls made of material adapted to dampen electrical or acoustic waves or both, such walls extending substantially in the spread direction of the waves and being arranged so as to form contiguous cells which may have the form of honeycomb cells. These walls may also be advantageously arranged so as to form cells of different depth and width, lying adjacent one another in honeycomblike nesting positions. It is also possible to internestle a large cell system with a smaller second cell system in such a manner that the first large system cell has a depth on the order of magnitude of fourth to fifth of the length of the longest wave to be absorbed. The depth of the cells of the second cell system may be considerably smaller. Upon using cells of approximately identical depth, a damping material may be used or provided upon a non-conductive carrier, for example, upon an insulating plate, in such a manner that the resistance of the damping material, as seen from the wave-permeated side, decreases steadily or in steps. The dimensioning of the arrangement according to the invention is advantageously carried out so as to make the product of the surface resistance of the damping material and cell width great at the end nearest to the wave source and steadily or stepwise decreasing in the direction of the propagation of the waves to be absorbed.

The cells of the arrangement according to the invention may be advantageously formed by interlacing preferably perpendicularly crossing strips which may be of different width if desired. The cells may however, also be formed by adjacently positioned at least partially telescoping tubes which may be of different diameter and of different length and the tubes of larger diameter may in such arrangement be of greater length. The walls of the cells may be so arranged that they embrace with the direction of propagation of the waves a greater or smaller angle. The individual cell walls may be made of light material, for example, of thin insulating material, cardboard, acoustically damping or other desired and suitable material which is by itself either a poor conductor as, for example, carbon, graphite or a semiconductor, or serves as a carrier for a resistance coating or layer. The resistance layers forming the surface resistance upon the nonconducting plates may be produced by carbonizing the plate surface. In order to affect the frequency passage, the cell walls may, for example, be perforated or may be provided with narrow slots or cutouts.

The damping arrangement according to the invention may also be formed in the manner of putting together building blocks by using suitable constructional elements. By combining constructional elements designed for different wave lengths, it is in simple manner possible to put together a damping arrangement for desired wave ranges.

The arrangement according to the invention makes it possible to provide in simple manner a selfsupporting structure exhibiting favorable features, particularly so far as the weight is concerned. A selfsupporting honeycomb cell structure may easily be formed in simple manner. The arrangement according to the invention yields above and beyond these advantages a light and air permeable structure and gives in addition the possibility of making the cell walls of acoustically damping material. If desired, a gridlike, honeycomb cell or wire mesh structure may be used for a backing or for a rear wall of the arrangement, such structure as compared with the damping arrangement according to the invention, exhibiting wave guide properties and therefore operating purely in a shielding manner.

The foregoing and additional objects and features will be brought out in the description which will presently be rendered with reference to the accompanying drawings showing in diagrammatic manner examples of the invention, in these drawings.

Figure 6:
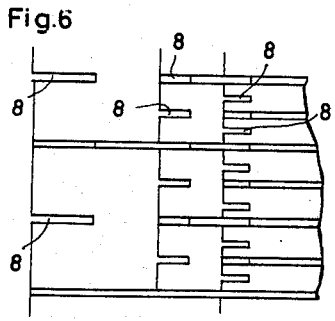
FIG. 6 shows a cross-sectional view of an arrangement comprising honeycomb cells provided with slots or cutout.
Figure 7:
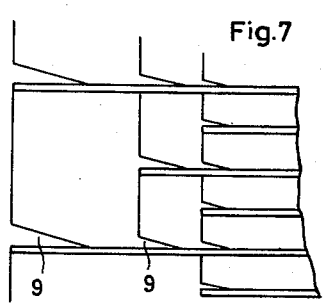
Figure 8:
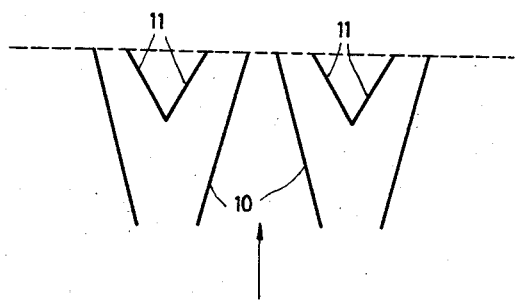
Figure 9:
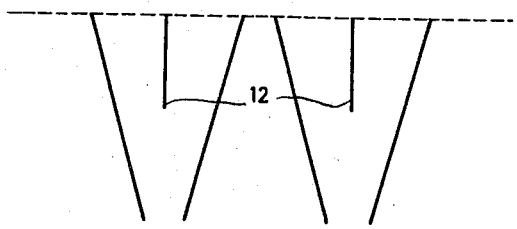

FIG. 7 indicates in cross-sectional view of a structure similar to the one shown in FIG. 6, in which are formed wedge-shaped cutouts;

FIG. 8 indicates in fractional cross-sectional view a damping arrangement having walls extending at an angle to the direction of wave propagation; and FIG. 9 is a fractional cross-sectional view of an arrangement comprising cells of changing width.

Figure 1:
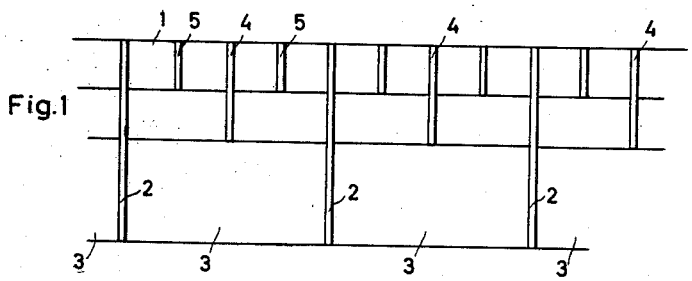
FIG. 1 shows a cross-sectional view of a damping arrangement.

Referring now to FIG. 1, numeral 1 indicates a conductive wall in front of which is provided a damping arrangement according to the invention. The wall 1 may be made of conductive material while the cell walls of the damping arrangement exhibit only a surface resistance. The walls 2 having the surface resistance extend deepest into the room or space permeated by waves and form cells with crosswise disposed walls 3. These cells are by means of walls 4 subdivided into smaller cells, and the latter are similarly subdivided by walls 5 to form still smaller cells.

Figure 2:
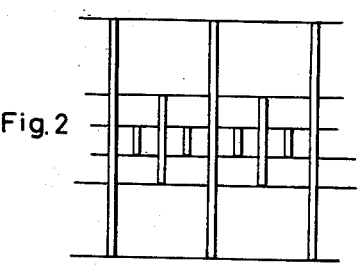
FIG. 2 is a cross-sectional view of a damping arrangement which is light permeable and air permeable.

The damping arrangement according to FIG. 2 is as compared with FIG. 1 supplemented symmetrically to the median plane. A reflecting wall such as in FIG. 1 is not present, but may be provided in the form of wire mesh, shaped metal, and the like.

Figure 3:
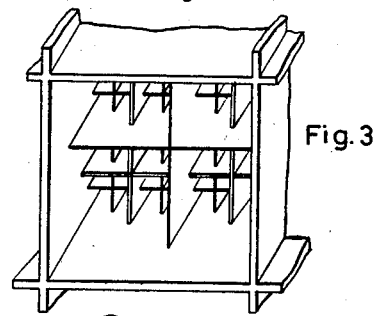
FIG. 3 is a diagrammatic partial perspective view of the arrangement according to FIGS. 1 and 2.

FIG. 3 indicates the structures of FIGS. 1 and 2 in fragmentary perspective view.

Figure 4:
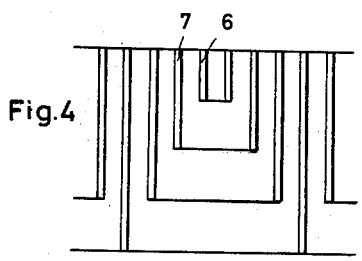
FIG. 4 shows a cross-sectional view of an arrangement comprising telescoped tubes of different diameter and different lengths.

The structure according to FIG. 4 comprises a plurality of inter-telescoped tubes of different diameter and different lengths which are advantageously so arranged that the tube such as 6 is disposed coaxial with a tube such as 7 and the latter similarly coaxial to the next outer tube, and so forth.

Figure 5:
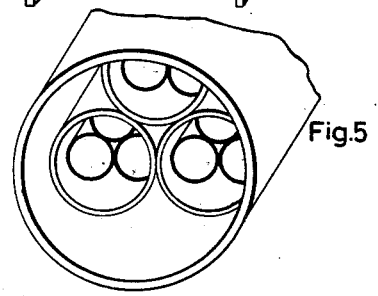
FIG. 5 is an arrangement utilizing tubes of larger diameter containing tubes of smaller diameter.

In the arrangement according to FIG. 5, there are provided several tubes of different diameter, the tubes of larger diameter containing tubes of smaller diameter. The subdivision may be carried so far that even the shortest waves may be sufficiently damped.

The electromagnetic and acoustic waves entering the arrangements described above will find in each case a damping system matched to the wave lengths. There are cells with great depth and great cross-sectional sizes for damping particularly the longer waves; shorter waves will be damped in the smaller cells. It is in this way possible to provide for the damping of the electromagnetic waves within a relatively great frequency range and to provide with corresponding construction of the walls for damping of acoustic waves within a similarly great range.

FIG. 6 shows the side view of an arrangement comprising cells assembled in honeycomb manner and having walls in which are formed narrow slots 8. These slots affect the frequency dependence of the damping.

Effects similar as in FIG. 6 may be obtained by forming in the cell walls cutouts 9 as shown in FIG. 7.

FIG. 8 indicates a damping arrangement comprising walls 10 and 11 which extend at an angle to the direction of propagation of the waves indicated by the arrow. The walls 11 are so positioned that they form with the walls 10 a cell system having channels of progressively decreasing width.

FIG. 9 also shows an arrangement comprising a cell system with channels of progressively changing width. Walls 12 are provided for subdividing the wider cell channels.

Changes may be made within the scope and spirit of the appended claims.

I claim:

1. In a substantially reflection-free damping structure for space-propagated electromagnetic waves, the combination of a plurality of walls made of plane plates of non-metallic wave-damping material, arranged to define a system comprising a plurality of mutually adjacent relatively large and relatively small cells, with each relatively large cell being subdivided by a plurality of relatively small cells, each of said cells being open at a corresponding end, at which space-propagated waves may enter, corresponding cells being symmetrically disposed with respect to a plane extending transverse to said walls, each of said walls being relatively thin as compared with the corresponding dimension of the respective cell which is at least partially defined thereby, said walls being provided with surfaces formed of a material having electromagnetic wave-damping characteristics, said corresponding open ends of the relatively small cells, at which space-propagated waves may enter, being spaced inwardly from the corresponding open ends of the relatively large cells whereby successively smaller cells are presented in the direction of propagation of waves entering such open ends.

2. A structure as defined in claim 1, wherein said walls are formed of damping material throughout.

3. A structure as defined in claim 1, wherein said walls are formed of insulating material and damping material carried by said insulating material.

4. A structure as defined in claim 1, wherein said walls are formed from insulating material and provided with means forming resistance layers thereon.

5. A structure as defined in claim 4, wherein said resistance layers are derived from the carbonization of the surfaces of said walls.

6. A structure as defined in claim 5, wherein the surface resistance of the damping material decreases in the direction of a wave propagation entering said open ends.

7. A structure as defined in claim 1, wherein the respective axes of such cells are substantially parallel to one another and to the direction of propagation of a wave to be damped entering said open ends, said plane being normal to such direction.

8. A structure as defined in claim 7, wherein the leading edges of the walls defining cells of different cross-sectional areas are disposed in respective planes with the edges of walls defining portions of two cells of different cross-sectional areas being positioned in the corresponding plane of the larger of the two cross-sectional areas so defined.

9. A structure as defined in claim 7, wherein the product of resistance of the damping material and the area defined by said walls decreases in the direction of a wave entering said ends.

10. A structure as defined in claim 1, wherein said cells are formed by intersecting interlaced strips.

11. A structure as defined in claim 1, wherein said walls have openings formed therein operative to affect the frequency of the waves expected to enter said open ends.

12. A structure as defined in claim 1, wherein the walls forming said cells are at least in part disposed in mutually angular relation.

13. A structure as defined in claim 1, comprising a first cell system of an overall relatively large size interlaced with a second cell system of an overall smaller size, said first cell system having cavities with a depth in the order of magnitude of the one-fourth to one-fifth of the longest electromagnetic wave expected to enter said open ends.

References Cited in the file of this patent

UNITED STATES PATENTS

| | | |
|---|---|---|
| 1,554,180 | Trader | Sept. 15, 1925 |
| 1,738,654 | James | Dec. 10, 1929 |
| 1,878,409 | Lyford | Sept. 20, 1932 |
| 2,247,341 | Anderson | June 24, 1941 |
| 2,464,006 | Tiley | Mar. 8, 1949 |
| 2,724,112 | Hepperle | Nov. 15, 1955 |
| 2,828,484 | Skellett | Mar. 25, 1958 |
| 2,840,811 | McMillan | June 24, 1958 |

FOREIGN PATENTS

| | | |
|---|---|---|
| 659,186 | Great Britain | Oct. 17, 1951 |